United States Patent [19]

McDonald

[11] Patent Number: 5,774,604
[45] Date of Patent: Jun. 30, 1998

[54] USING AN ASYMMETRIC ELEMENT TO CREATE A 1XN OPTICAL SWITCH

[75] Inventor: Terrance G. McDonald, Plano, Tex.

[73] Assignee: Texas Instruments Incorporated, Dallas, Tex.

[21] Appl. No.: 735,630

[22] Filed: Oct. 23, 1996

[51] Int. Cl.⁶ ..................................... G02B 6/26
[52] U.S. Cl. ............................... 385/18; 385/19; 385/22; 359/223; 359/230
[58] Field of Search .................. 385/18, 19, 20, 385/22, 14, 47, 24; 359/223, 225, 226, 230, 846, 847, 848, 850, 855, 865

[56] References Cited

U.S. PATENT DOCUMENTS

| | | | |
|---|---|---|---|
| 4,303,303 | 12/1981 | Aoyama | 385/18 |
| 5,155,778 | 10/1992 | Magel et al. | 385/18 |
| 5,199,088 | 3/1993 | Magel | 385/18 |
| 5,345,521 | 9/1994 | McDonald et al. | 385/19 |

*Primary Examiner*—Rodney B. Bovernick
*Assistant Examiner*—Hemang Sanghavi
*Attorney, Agent, or Firm*—Julie L. Reed; James C. Kesterson; Richard L. Donaldson

[57] ABSTRACT

An architecture for a compact, 1×N optical switch. The switch package receives light from an input optical fiber (12b), which is directed over a well or gap at the bottom of which lies a micromechanical structure (10). If the structure is in an unaddressed state, the light travels into an in line output optical fiber (12a). If the structure (10) is in an addressed state, it intercepts the light and reflects it out of the plane of the input optical fiber to an offset mirror (24). The offset mirror (24) then reflects the light to one output fiber (16a, 16b). The offset mirror may have steps such that more than one optical fiber could become the output fiber, depending upon the structure's position.

5 Claims, 1 Drawing Sheet

USING AN ASYMMETRIC ELEMENT TO CREATE A 1XN OPTICAL SWITCH

BACKGROUND OF THE INVENTION

1. Field of the Invention

This invention relates to optical switching, more particularly to architectures for micromechanical optical switches.

2. Background of the Invention

The use of micromechanical optical switches in optical information processing have several advantages. First, these types of switches have manufacturing advantages, since their manufacturing is compatible with most semiconductor processing. Second, they have relatively stable digital operation. Finally, they tend to have faster switching times.

Several methods and structures of optical switching using micromechanical modulators have been proposed. In one method, optical fibers are connected to a substrate upon which are arrays of lenses on either side of an orientation-dependent etched (ODE) mirror. The light is brought into one fiber, reflected off of the ODE mirror to a second plane and either switched back down to the other surface of the ODE mirror and into the output fiber, or directed away from the ODE mirror. This approach can be found in U.S. Pat. No. 5,155,778, dated Oct. 13, 1992.

A second method and architecture is shown in U.S. Pat. No. 5,199,088. The input fiber is parallel with two output fibers. They are aligned and held in a package that has a micromechanical optical switch opposite them. Light coming in one fiber is directed to the switch, the position of that switch determines the output fiber to which the light will travel. In this embodiment, the operation of the switch is perpendicular to the plane of the fibers.

Another method uses a micromechanical optical switch that is asymmetric about a tilting axis. The switch is recessed below the plane of the input and output fibers. Light will travel across the gap, unless the switch is activated such that the longer end of the element projects up between the two fibers. This effectively prevents the light from traveling into the output fiber and thereby allows the structure to function as an ON/OFF switch. This is shown in U.S. Pat. No. 5,345,521.

In the first and third methods, the architecture only enables an ON/OFF switch, rather than having a routing capability. In order to have any kind of routing, there must be an equal number of input and output fibers, since the light is either transmitted or not. In the second method, the fibers lie in a plane perpendicular to the switch plane, which causes them to extend a minimum distance above the top of the switch assembly. The minimum distance is determined by the fiber bend angle. This results in a switch that has special packaging requirements and cannot be socketed as in a typical integrated circuit. Therefore, a need exists for an architecture for optical switching beyond ON/OFF switching using the capabilities of micromechanical structures.

SUMMARY OF THE INVENTION

In one embodiment of the invention, a micromechanical structure is positioned in a recess between an input fiber and at least two output fibers. The light coming in the input fiber is directed by the optical switch to one of the output fibers. The output fibers are positioned to accept light from the input fiber when the micromechanical switch is in its flat position. Another fiber is positioned such that when the switch is in another position, the light directed by the switch is transmitted to that fiber via an offset mirror. The offset mirror could be stepped into different positions to allow several different fibers to be selected as the output fiber.

It is an advantage of this switch in that it is smaller is size and can be socketed as a typical integrated circuit.

It is another advantage of this switch in that it allows for 1 input fiber by N output fibers for routing.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
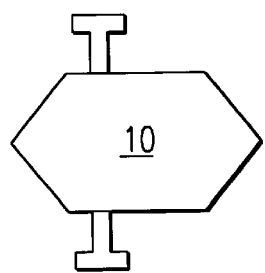
FIGS. 1a, 1b and 1c show embodiments of asymmetric micromechanical light shutters that can be used as optical switches.
Figure 1B:
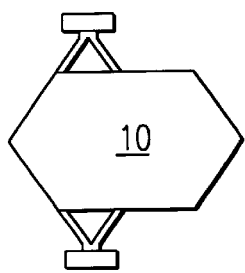
Figure 1C:
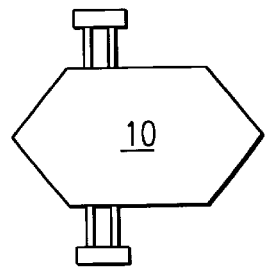

One embodiment of a micromechanical structure suitable for use in an optical switch is shown in FIGS. 1a–1c. The structure 10 has a reflective surface which is supported by some type of flexible hinge or flange that allows the structure 10 to move freely. FIG. 1a shows a structure with its reflective surface supported by two straight hinges. Alternate embodiments of the hinges are shown in FIGS. 1b and 1c. The selection of the architecture of the flexible hinge or flange depends upon the stresses endured by the hinge when the surface moves, which is in turn dependent upon the size, composition and actuation of the structure.

While the structures shown are asymmetrical, it may not necessarily be so. The surface shown is a micromechanical structure that is supported by these hinges over a well or gap. The well or gap underneath the surface is created by sputtering the reflective material over some type of removable spacing material. In order to achieve a high angle of deflection, the spacer has to be either thick relative to current semiconductor processing, or the hinges placed such that the free-moving side of the structure is allowed to deflect with more freedom.

Figure 2A:
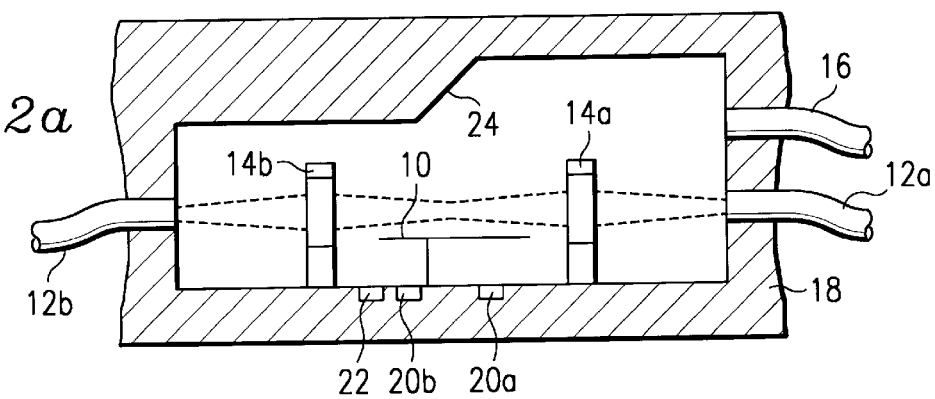
FIGS. 2a and 2b show one embodiment of a 1×2 optical switch.
Figure 2B:
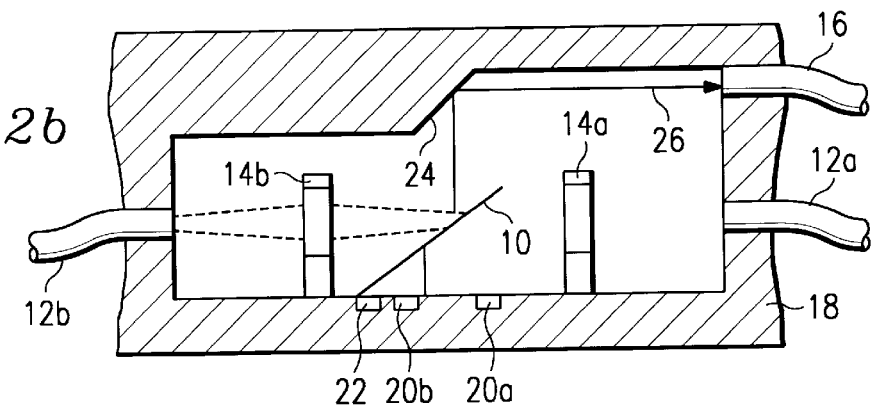

FIGS. 2a and 2b show one embodiment of an optical switch that has such a structure for switching. The structure 10 is positioned in a well, over addressing or actuating circuitry. In this embodiment, the addressing circuitry comprises two addressing electrodes 20a and 20b. When electrode 20b is activated, usually by application of a voltage, the structure 10 will be attracted towards that electrode as a result of electrostatic forces. The structure 10 will then tilt as shown in FIG. 2b. The shorter end, or end that is closer to the hinges, can touch down on landing electrode 22.

In order to avoid any current flow which would cause spot welding of the structure to the landing electrode 22, the landing electrode 22 is typically held either at the same bias as the structure 10, or with no bias, if none is applied to structure 10. Addressing electrode 20a may be used to attract the structure 10 in order to cause it to release from landing electrode 22, or it may not be needed at all.

Returning to FIG. 2a, the switch is configured such that output fiber 12a, which is in line with input fiber 12b would receive the light from the switch. The light enters the switch through fiber 12b and is transmitted through the microlens 14b. In this case, where the structure has not been deflected, the light will continue to microlens 14a and be transmitted out of the switch via output fiber 12a.

In FIG. 2b, the switch is configured such that output fiber 16 receives the light. The light enters through fiber 12b and microlens 14b, but encounters the tilted structure 10. The surface of structure 10 should be manufactured out of a highly reflective material that is compatible with the processing to create the micromechanical structure, such as aluminum. The light from microlens 14b is then reflected to offset mirror 24. This mirror 24 then reflects the light to output fiber 16. In this way, the structure becomes an addressable 1×2 switch.

Offset mirror 24 could be manufactured in several ways, including orientation dependent etching (ODE) in silicon, diamond turned in metal, etched in a glass substrate, or ultrasonically cut into a ceramic, as examples. The top of the package, of which the mirror 24 is a part, is mounted over the substrate 18 which contains the microlenses, the fiber guides and the structure 10.

Figure 3:
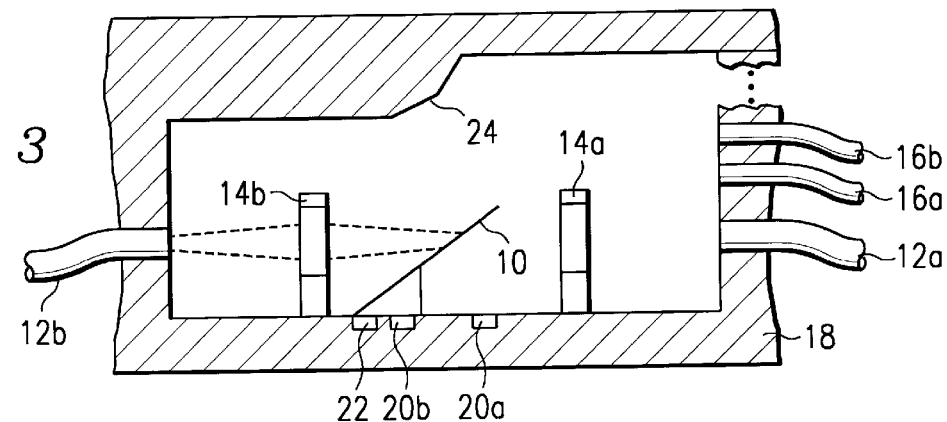
FIG. 3 shows one, embodiment of a 1×N optical switch.

Additionally, the package could contain several output fibers and a stepped offset mirror 24, as shown in FIG. 3. The incoming light is then either sent to output fiber 12, or reflected off of offset mirror 24. If offset mirror 24 had stepped reflecting surfaces, the position of the reflected beam would become adjustable, provided that element 10 had more than one state. This would allow the light to be output to fibers 16a, 16b, etc. In this manner, the switch becomes a 1×N switch.

Thus, although there has been described to this point a particular embodiment for an optical switch, it is not intended that such specific references be considered as limitations upon the scope of this invention except in-so-far as set forth in the following claims.

What is claimed is:

1. An optical switch for switching light between optical fibers, comprising:

an input optical fiber for bringing light into a switch package;

a micromechanical structure placed in said package such that light from said input optical fiber is transmitted over said structure when said structure is in an unaddressed state;

a first output optical fiber, wherein said first output fiber is positioned such that light is received by said first output fiber when said micromechanical structure is in said unaddressed state;

an offset mirror, wherein said offset mirror is positioned such that light is transmitted to and reflected off of said offset mirror when said micromechanical structure is in an addressed and deflected state, and wherein said offset mirror is stepped such that a different optical fiber receives said light depending upon the position of said micromechanical structure; and at least one other optical output fiber for receiving light from said offset mirror, such that only one of said other output fibers receives said light at any one instant in time.

2. The optical switch as claimed in claim 1 wherein said micromechanical structure further comprises a landing electrode such that when said structure is in said addressed state, said structure comes into contact with said landing electrode.

3. The optical switch as claimed in claim 1 wherein said offset mirror further comprises a mirror with one reflective surface.

4. The optical switch as claimed in claim 1 wherein said micromechanical structure is mounted asymmetrically.

5. The optical switch as claimed in claim 1 wherein said micromechanical structure is mounted symmetrically.

* * * * *